(12) United States Patent
Kosbab et al.

(10) Patent No.: US 8,898,280 B2
(45) Date of Patent: Nov. 25, 2014

(54) METHODS AND APPARATUS FOR DETERMINING AND DISPLAYING WAN OPTIMIZATION ATTRIBUTES FOR INDIVIDUAL TRANSACTIONS

(75) Inventors: Bruce Kosbab, Colorado Springs, CO (US); Daniel Prescott, Colorado Springs, CO (US); Richard Houde, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 979 days.

(21) Appl. No.: 12/388,974

(22) Filed: Feb. 19, 2009

(65) Prior Publication Data
US 2010/0211673 A1    Aug. 19, 2010

(51) Int. Cl.
| | |
|---|---|
| G06F 15/173 | (2006.01) |
| H04L 12/24 | (2006.01) |
| H04L 12/815 | (2013.01) |
| H04L 12/26 | (2006.01) |
| H04M 3/22 | (2006.01) |
| H04W 24/00 | (2009.01) |

(52) U.S. Cl.
CPC ............. H04L 41/5009 (2013.01); *H04L 47/22* (2013.01); *H04L 12/2626* (2013.01); *H04M 3/22* (2013.01); H04L 43/062 (2013.01); *H04L 43/12* (2013.01); H04L 43/045 (2013.01); *H04W 24/00* (2013.01); H04L 43/0864 (2013.01); *H04L 43/08* (2013.01); *H04L 43/026* (2013.01)
USPC .......................................... 709/224; 702/182

(58) Field of Classification Search
CPC ......... H04L 43/00–43/50; H04L 47/22–47/25; H04L 12/96–12/2697; H04W 24/00–24/10; H04M 3/22–3/367

USPC .......................... 709/223–224; 370/252–253; 702/182–188
See application file for complete search history.

(56) References Cited

U.S. PATENT DOCUMENTS

| | | | |
|---|---|---|---|
| 6,701,363 B1 | 3/2004 | Chiu et al. | |
| 6,738,933 B2 * | 5/2004 | Fraenkel et al. | 714/47 |
| 6,940,864 B2 * | 9/2005 | Abdelilah et al. | 370/412 |

(Continued)

FOREIGN PATENT DOCUMENTS

| | | |
|---|---|---|
| EP | 1039687 A2 | 9/2000 |
| WO | 2008119929 A2 | 10/2008 |

OTHER PUBLICATIONS

European Search Report dated Nov. 13, 2009; cited in application No. 09010529.7.

*Primary Examiner* — Patrice Winder
*Assistant Examiner* — Julian Chang
(74) *Attorney, Agent, or Firm* — Edwards Wildman Palmer LLP; Scott D. Wofsy; Christopher J. Capelli

(57) ABSTRACT

An apparatus for associating WAN optimization attributes with performance metrics of transactions between hosts on a network includes a network management device, a processor, and a display device. The network management device monitors data traffic between hosts communicating over the network and collects WAN optimization information relating to the data traffic. The data traffic includes individual flows between the hosts, and the individual flows include individual transactions involving exchanges of packets. The processor computes at least one performance metric for individual transactions between the hosts and determines what types, if any, of WAN optimization were applied to the individual transactions. The display device displays on an individual transaction basis the performance metric in combination with either the types of WAN optimization applied to the individual transaction or an indication that no WAN optimization was applied to the individual transaction.

20 Claims, 7 Drawing Sheets

(56) References Cited

U.S. PATENT DOCUMENTS

| | | | |
|---|---|---|---|
| 7,120,666 B2* | 10/2006 | McCanne et al. | 709/203 |
| 7,290,048 B1* | 10/2007 | Barnett et al. | 709/223 |
| 7,385,924 B1* | 6/2008 | Riddle | 370/235 |
| 7,437,451 B2* | 10/2008 | Tang et al. | 709/224 |
| 7,460,038 B2 | 12/2008 | Samuels et al. | |
| 7,506,047 B2* | 3/2009 | Wiles, Jr. | 709/224 |
| 7,581,005 B2* | 8/2009 | Montemayor et al. | 709/225 |
| 7,664,857 B2* | 2/2010 | Ovsiannikov et al. | 709/225 |
| 7,734,775 B2* | 6/2010 | Barnett et al. | 709/224 |
| 2006/0023638 A1* | 2/2006 | Monaco et al. | 370/252 |
| 2006/0028999 A1* | 2/2006 | Iakobashvili et al. | 370/252 |
| 2006/0190231 A1* | 8/2006 | Malloy et al. | 703/14 |
| 2007/0276938 A1* | 11/2007 | Ottamalika et al. | 709/224 |
| 2008/0181213 A1* | 7/2008 | Ovsiannikov et al. | 370/389 |
| 2008/0229323 A1 | 9/2008 | Mackey | |
| 2008/0281908 A1 | 11/2008 | McCanne et al. | |
| 2009/0228585 A1 | 9/2009 | Kosbab et al. | |
| 2009/0296589 A1 | 12/2009 | Prescott et al. | |
| 2010/0088410 A1* | 4/2010 | Ridley | 709/224 |
| 2010/0121975 A1* | 5/2010 | Sinha et al. | 709/231 |
| 2010/0128623 A1* | 5/2010 | Dunn et al. | 370/252 |

* cited by examiner

Transactions

Show Columns: ☑ Overview ☑ Performance ☐ TCP ☑ WAN ☐ Usage ☐ Site ☐ Ports ☐ Server IP/Name Export To CSV Search: _____

| | | Time | Application | Client IP | Server IP | EURT (ms) | ART (ms) | Client DTT (ms) | Server DTT (ms) | NRT (ms) | WAN Optimization Policy | Request |
|---|---|---|---|---|---|---|---|---|---|---|---|---|
| 31 | ☐☐ | Nov 17, 19:16:55.987 | LBC_Portal 8080 | 10.1.1.106 | 20.1.1.29 | 1,229 | 22 | 0 | 806 | 401 | -- | GET / |
| 32 | ☐☐ | Nov 17, 19:16:55.950 | LBC_Portal 8008 | 10.1.1.153 | 20.1.1.26 | 226 | 24 | 0 | 1 | 201 | TFO | GET /page1.html |
| 33 | ☐☐ | Nov 17, 19:16:55.783 | LBC_Portal 8080 | 10.1.1.176 | 20.1.1.25 | 1,244 | 38 | 0 | 805 | 401 | -- | GET / |
| 34 | ☐☐ | Nov 17, 19:16:55.637 | LBC_Portal 80 | 10.1.1.130 | 20.1.1.27 | 221 | 18 | 0 | 2 | 201 | TFO+DRE+LZ+HTTP | GET / |
| 35 | ☐☐ | Nov 17, 19:16:55.540 | LBC_Portal 8080 | 10.1.1.106 | 20.1.1.28 | 243 | 41 | 0 | 1 | 201 | -- | GET /page3.html |
| 36 | ☐☐ | Nov 17, 19:16:55.522 | LBC_Portal 8008 | 10.1.1.153 | 20.1.1.26 | 222 | 20 | 0 | 1 | 201 | TFO | GET /index.html |
| 37 | ☐☐ | Nov 17, 19:16:55.311 | LBC_Portal 8080 | 10.1.1.106 | 20.1.1.28 | 228 | 25 | 0 | 1 | 202 | -- | GET /page2.html |
| 38 | ☐☐ | Nov 17, 19:16:54.968 | LBC_Portal 80 | 10.1.1.130 | 20.1.1.26 | 218 | 16 | 0 | 1 | 401 | TFO+DRE+LZ+HTTP | GET /page2.html |
| 39 | ☐☐ | Nov 17, 19:16:54.891 | LBC_Portal 8080 | 10.1.1.106 | 20.1.1.28 | 418 | 13 | 0 | 203 | 202 | -- | GET /page1.html |
| 40 | ☐☐ | Nov 17, 19:16:54.884 | LBC_Portal 8008 | 10.1.1.153 | 20.1.1.26 | 232 | 30 | 0 | 1 | 201 | TFO | GET / |
| 41 | ☐☐ | Nov 17, 19:16:54.743 | LBC_Portal 80 | 10.1.1.130 | 20.1.1.26 | 214 | 12 | 0 | 1 | 201 | TFO+DRE+LZ+HTTP | GET /page1.html |
| 42 | ☐☐ | Nov 17, 19:16:54.730 | LBC_Portal 8008 | 10.1.1.176 | 20.1.1.29 | 214 | 12 | 0 | 1 | 201 | TFO | GET /page2.html |
| 43 | ☐☐ | Nov 17, 19:16:54.491 | LBC_Portal 80 | 10.1.1.130 | 20.1.1.26 | 243 | 41 | 0 | 1 | 201 | TFO+DRE+LZ+HTTP | GET /index.html |
| 44 | ☐☐ | Nov 17, 19:16:54.459 | LBC_Portal 8080 | 10.1.1.106 | 20.1.1.28 | 431 | 27 | 0 | 202 | 202 | -- | GET /index.html |
| 45 | ☐☐ | Nov 17, 19:16:54.307 | LBC_Portal 8008 | 10.1.1.176 | 20.1.1.29 | 220 | 19 | 0 | 0 | 201 | TFO | GET /page1.html |

| | | Time | Client IP | Site | Application | Trans Type | End-User Response Time (ms) | WAN Optimization Policy |
|---|---|---|---|---|---|---|---|---|
| 1 | ☐☐ | Jan 23, 16:39:59.951 | 10.2.30.127 | Atlanta | Http Logistics | HTTP REQ GET | 1,269 | TFO |
| 2 | ☐☐ | Jan 23, 16:39:59.518 | 10.2.30.245 | Atlanta | Http Logistics | HTTP REQ GET | 1,228 | TFO |
| 3 | ☐☐ | Jan 23, 16:39:59.178 | 10.2.30.127 | Atlanta | Http Logistics | HTTP REQ GET | 1,252 | TFO |
| 4 | ☐☐ | Jan 23, 16:39:59.041 | 10.2.30.32 | Atlanta | Http Logistics | HTTP REQ GET | 1,161 | TFO |
| 5 | ☐☐ | Jan 23, 16:39:58.736 | 10.2.30.15 | Atlanta | Http Logistics | HTTP REQ GET | 1,495 | TFO |

METHODS AND APPARATUS FOR DETERMINING AND DISPLAYING WAN OPTIMIZATION ATTRIBUTES FOR INDIVIDUAL TRANSACTIONS

BACKGROUND

Wide area network (WAN) optimization increasingly is being used to improve the performance and efficiency of wide area networks that transport data among sites. Various types of WAN optimization (also known as WAN acceleration) are offered by vendors such as Cisco Systems, Riverbed Technology, Juniper Networks, Citrix Systems, and others. Typically, WAN optimization products include a suite of different types of WAN optimization which can generally be categorized as: traffic or flow management; caching; compression; protocol optimization; and error correction. For example, Cisco's Wide Area Application Services (WAAS) product currently includes TCP flow optimization (TFO) which optimizes TCP parameters such as window sizes, maximum segment size, packet sequence numbering, etc. to ensure efficient flow of packets over the WAN. The WAAS optimization suite also includes compression such as LZ, PLZ, or LZR compression, which compresses data prior to transmission and decompresses the data at the far end. A third type of optimization performed by the WAAS product is data redundancy elimination (DRE), which involves caching data at both endpoints and includes the ability to avoid re-transmission of blocks of data that have already been received at the far end. In addition to these TCP-level optimizations (TFO, LZ, and DRE), the WAAS product incorporates application-specific optimization, including optimizers for a number of specific protocols or applications such as HTTP, certain types of file transfers, video streaming applications, and others.

Service providers and enterprises have historically managed their networks by placing network management devices at key points in the network. These network management devices monitor network performance and communicate information to backend network operations centers for troubleshooting and corrective action. As WAN optimization becomes increasingly ubiquitous, it would be desirable to enhance the capability to monitor the impact of the various types of optimization on network performance, from a high level down to the individual transaction level.

SUMMARY

Methods and apparatus for associating WAN optimization attributes with performance metrics of individual transactions between hosts on a network are described herein. A network management device monitors data traffic between hosts communicating over the network and collects WAN optimization information relating to the data traffic. The data traffic includes individual flows between the hosts, and the individual flows include individual transactions involving exchanges of packets. A processor computes at least one performance metric for individual transactions between the hosts and determines what types, if any, of WAN optimization were applied to the individual transactions. The display device displays on an individual transaction basis the performance metric in combination with either the types of WAN optimization applied to the individual transaction or an indication that no WAN optimization was applied to the individual transaction. Performance metrics can be computed and displayed in combination with the applied WAN optimization at higher levels such as the flow level, the application level, the host (e.g., server or client) level, the site level, and for an entire enterprise or network. By selecting suitable filtering options via a user interface, the performance results displayed can be limited to only those transactions, flow, applications, hosts, sites, and/or performance levels of interest.

The system described herein enables the WAN optimization attributes that are affecting a flow and/or transaction as it traverses the network to be displayed along with resulting measure of performance. The ability to calculate and display the WAN optimization policy and type of optimization that is being used on a specific flow and transaction provides the unique ability to monitor and troubleshoot application performance issues as they relate to a WAN optimized environment. Visualization and quantification of the impact of WAN optimization attributes on one or more performance metrics is provided from a high level in the network all the way down to an individual transaction layer.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 6 is an exemplary screen shot displaying a transaction view according to an embodiment of the invention, including a transaction log containing performance information and the type(s) of WAN optimization applied to the individual transactions.

FIG. 7 is an exemplary screen shot illustrating display configuration options for a transaction viewer display window.

DETAILED DESCRIPTION

Figure 1:
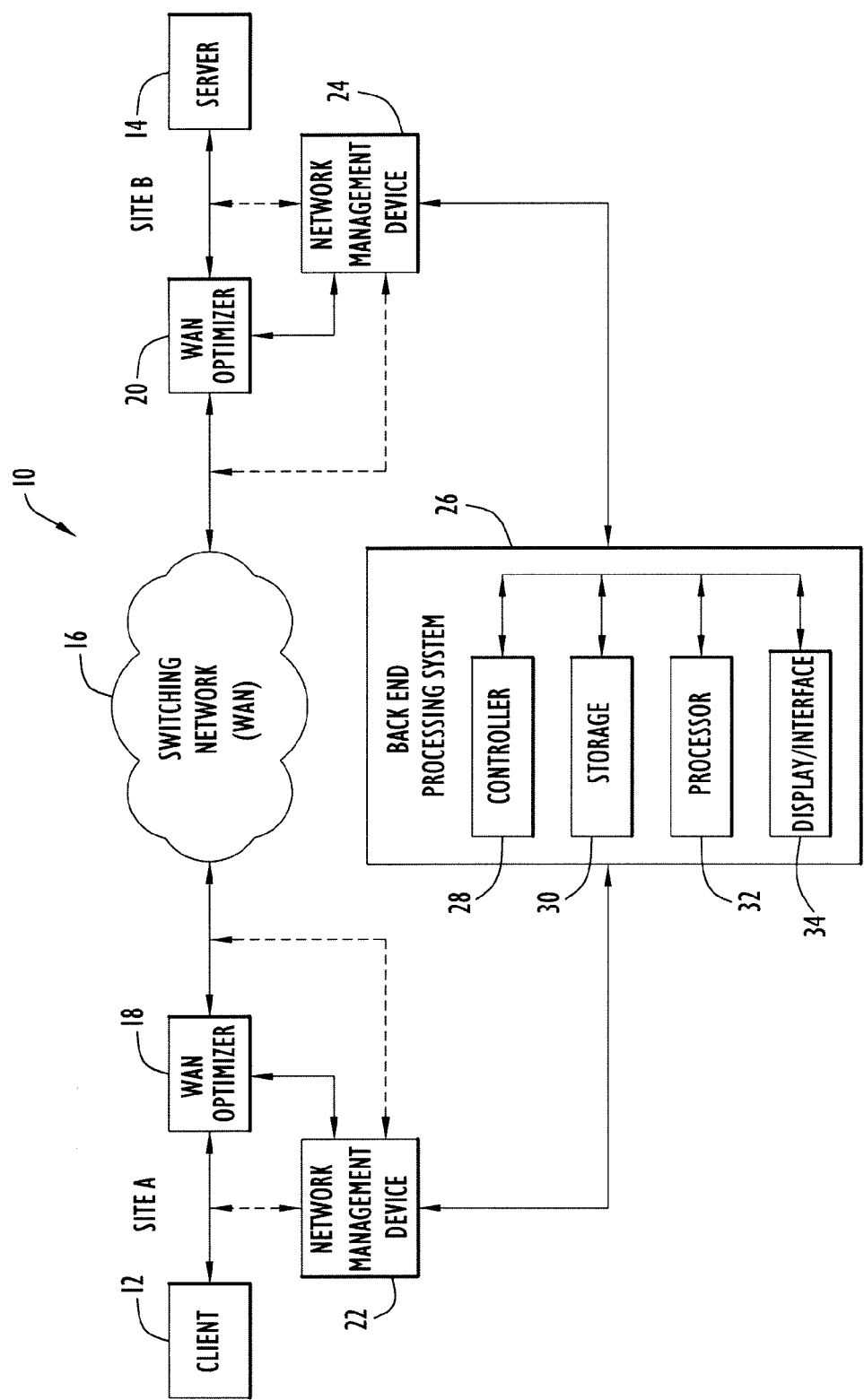
FIG. 1 is a block diagram of a network environment in which the network monitoring and analysis techniques described herein may be employed.

The following detailed explanations of FIGS. 1-7 and of the exemplary embodiments reveal the methods and apparatus of the present invention. FIG. 1 illustrates, at a very general level, a data transmission system (communication network) that includes a network management system for monitoring performance of the network. As shown in FIG. 1, an exemplary data transmission system 10 includes a number of sites, including sites A and B, and a switching network 16 such as a wide area network (WAN) to facilitate communications between the sites. Each of sites A and B can include, for example, one or more local area networks (LANs). Routers (not shown in FIG. 1) can interconnect the local site LANs ultimately to the WAN represented by the switching network cloud 16 in FIG. 1. A packet traveling across the WAN between the devices at the endpoint sites traverses one or more network paths connecting the sites. Typically, a packet's path includes several physical communication links and intermediate devices (e.g., switches and/or routers) that transmit a packet along a correct route from one site to another, and transmit the response packets back across the network in the opposite direction.

Site A may include a client 12 that communicates with a server 14 at site B over network 16. The terms "client" and "server" are reference labels used here for convenience and descriptiveness due to their common usage in the art and to avoid confusion as to which end point is being referred to in the following descriptions of exchanges between devices at two locations. However, it will be appreciated that the invention is not limited to any particular devices or equipment, and the invention is applicable in the context of any computing devices or network equipment communicating or exchanging information over a network. Generically, both devices involved in an exchange over a network also can be considered "host" devices or simply "user" devices.

A WAN optimization unit (WAN optimizer) 18 is provided at site A between the client 12 and WAN 16 and is capable of performing one or more of the previously-described WAN optimization techniques. One non-limiting example of such a WAN optimizer is Cisco Systems' Wide Area Application Engine (WAE) device which provides aforementioned WAAS optimization options. In general, the WAN optimizer may provide a suite of optimization techniques, such as those previously described, and can be configured to suit the needs of the network devices supported at the site. A similar WAN optimizer 20 can be provided at site B between server 14 and WAN 16. The WAN optimizers 18 and 20 on each end intercept TCP connections (for example) across the network and optimize the TCP connections. While both sites shown in FIG. 1 include a WAN optimizer, it is possible that other sites or devices communicating over network 16 may lack a WAN optimizer, and client 12 and/or server 14 may communicate with devices at such other sites.

In the general example shown in FIG. 1, the data transmission system 10 can include any of a number of communications line types and a variety of data communications connections. Sites A and B are each capable of transmitting and receiving data packets in various protocols utilized by the communication lines. As used herein the terms "data network," "switching network," "network," "LAN," "WAN," etc. refer to networks that carry virtually any kind of information and are not limited to any particular type of hardware, technology, protocol, application, or data (audio, video, digital data, telephony, etc.). For illustrative purposes, only two sites (A and B) are shown in FIG. 1. However, it will be understood that the data communication system can include numerous sites, wherein each site is generally connected to multiple other sites over corresponding transmission circuits within the switching network.

The network management system essentially includes a number of network management devices (NMDs) 22, 24 located throughout the network, which monitor network activity and collect network performance data, and at least one back-end processing system 26 that coordinates and controls the system, collects and processes measurement data received from the NMDs, monitors and analyzes network performance, displays network performance, and notifies network operators when performance problems are detected. Such a network management system can provide, for example: accurate and reliable measurement of performance metrics such as network latency, jitter, data delivery ratio, and throughput; management of user performance requirements with configurable sensitivity; a context-sensitive data repository which enables the assessment and evaluation of network performance with respect to circuit, time, bandwidth, and performance requirements; and/or forecasting of potential or developing network performance problems.

As shown in FIG. 1, network management devices (NMDs) 22 and 26 are respectively disposed at sites A and B or at some point between WAN 16 and sites A and B, respectively. In general, NMDs can be placed at virtually any point in the network or any point within an enterprise LAN (e.g., at local sites, at intermediate points between local sites and the WAN, and within the WAN itself). The placement of the NMDs depends at least in part on the portion of the system or network over which a network service provider or other party wishes to monitor performance of data traffic flow. For example, NMDs can be connected to a local router or switch such that the NMD is not in-line with the data flow path through the router between the LAN(s) and the WAN. NMDs can also be connected in-line between a local router and a customer edge router (CER), or in-line between a CER and the WAN, for example.

The NMDs can be any type of monitoring device or probe and can comprise standalone hardware/software devices or software and/or hardware added to network equipment such as PCs, routers, CSU/DSUs (channel service unit/data service unit), FRADS, voice switches, phones, etc. Software embedded in the NMDs can collect network performance data for detailed analysis and report generation relating to any of a variety of performance metrics. By way of a non-limiting example, an NMD can be a CSU/DSU that operates both as standard CSU/DSU and as a managed device capable of monitoring and inserting network management traffic; an inline device residing between a DSU and router, which monitors network traffic and inserts network management traffic; or a passive monitoring device that only monitors network traffic. The NMDs can also be "active" monitoring devices capable of inserting test packets or messages into the data traffic.

In the example shown in FIG. 1, NMDs are respectively located at both the client site A and at the server site B; however, it is also possible to have an NMD at only one of the two sites involved in a client-server exchange. In the arrangement shown in FIG. 1, NMD 22 at client site A is not in-line with the traffic flow between client 12, WAN optimizer 18, and WAN 16; however, NMD 22 could be arranged in-line with client 12 and WAN optimizer 18. NMD 22 can passively monitor traffic from the signal line between client 12 and WAN 16 and receives WAN optimization policy information from WAN optimizer 18. Alternatively, NMD 22 may actively communicate with WAN optimizer 18 and/or have an active roll in traffic flow. The same configuration options exist for NMD 24 at the server site B.

Each NMD can collect measurement data relating to any of a variety of performance metrics associated with operation of the network including, but not limited to latency, response times, network round-trip time, jitter, data delivery ratio, throughput, and other measures indicative of delivery efficiency and failure rates. It will be understood that the invention is not limited to the measurement or analysis of any particular performance metric or any particular combination of metrics.

The backend processing system 26 of the network management system shown in FIG. 1 receives measurement data either directly or indirectly from the NMDs, and collects and stores measurement data and processes the data to produce the various displays and reports required to monitor performance of the network and its components. The architecture depicted in FIG. 1 is a conceptual diagram illustrating major functional units and does not necessarily illustrate physical relationships or specific physical devices within the backend processing system or between the backend processing system and the NMDs. The configuration and components of the backend processing system can take many forms and are described herein only in general terms for context. Those skilled in the art will appreciate that the techniques described herein for communicating within a network management are applicable regardless of the particular architecture of the backend processing system or NMDs.

Backend processing system 26 includes a controller module 28 responsible for coordinating and controlling the network management system. For example, controller 28 may be responsible for sending instructions to the various NMDs and periodically polling the NMDs to collect measured data. A data storage capability of the backend processing system is represented by storage module 30 for storing measurement data as well as information generated by processing measurement data, such as aggregated report data, analysis results, and historical information. Processing system 26 further includes a management and processing capability represented in FIG. 1 by processor module 32, which performs various processing tasks, such as performing operations on raw measurement data to produce reports and performing analysis operations. The backend processing system 26 further includes a display, interface, and report capability represented by display/interface module 34, which displays performance information in a tabular or graphical manner via an interactive graphical user interface, for example, and preferably includes the capability to generate various performance reports. Display device 34 can be any of a wide variety of known devices, such as an LCD display whose optical state is transformed by controlling the color of light emitted by individual pixels based on input from a user (mouse, keypad, touch screen, etc.) or from a processor. For example, the display device 34 can be a graphical user interface (GUI) which allows the user to selectively control the format and content of the display.

The backend processing system 26 may receive measurement data directly from the NMDs or may receive measurement data indirectly (e.g., the NMDs may supply measurement data to a storage device at the local site, which is subsequently supplied to the backend processing system. Further, the backend processing system may be located at a single site or may have components distributed throughout the network at multiple locations. For example, storage module 30 may constitute storage capabilities at a number of local sites as well as a storage capability at one or more backend processing sites. Likewise, various backend processing tasks, nominally represented by processor 32 in FIG. 1, may be performed by a number of different processors that carry out specific tasks and that may be distributed throughout the network. Similarly, the display/interface capability may allow access to performance information via interfaces at a number of sites or via a web-based interface accessible to authorized customers or service provider personnel.

In general, communication over WAN 16 involves a bidirectional exchange of data (e.g., packets) between client 12 and server 14. Client 12 may initiate communication by opening a transport channel to server 14. Typically, the client sends a request in accordance with network and transport protocols, and the server responds to the request by sending some form of information or data back to the client. Certain protocols are connection-based, requiring the client and server to establish a communication session before exchanging information. This is generally accomplished by exchanging handshaking messages to establish a "connection" between the client and server. Once the connection is established, communication between the client and server can proceed by exchanging messages via packets or the like according to an underlying network protocol. Once the client and the server agree that the session is over or a timeout occurs, the connection underlying the session is terminated.

Networking protocols are used to carry out communications between the client and server. Several networking protocols have been designed and deployed, with varying characteristics and capabilities. At the network layer, the Internet Protocol (IP) is ubiquitous and is responsible for routing packets from one end host (client or server) to another. At the transport layer, the Transmission Control Protocol (TCP) and the User Datagram Protocol (UDP) are two examples of protocols that are in common use today. TCP provides a reliable, connection-oriented service on top of the unreliable packet delivery service provided by IP. Various other networking protocols might also be used.

A Flow is an exchange of packets between a source address (e.g., a client) and a destination address (e.g., a server). Packets between the hosts are organized into flows by examining the source and destination addresses together with the source and destination port numbers (according to protocol) of the packet. In the case of TCP, a flow or session is an individual TCP socket connection. A TCP socket is initiated with a three-way handshaking scheme in which the client sends a SYN message to the server, the server responds with a SYN ACK message, and the client confirms with an ACK message. The TCP flow continues until a FIN message exchange occurs or one of the hosts sends a reset message, e.g., as a result of a timeout. Thus, depending on how long the TCP socket connection is maintained, a TCP session or flow can be brief or last a considerable period of time.

Figure 2:
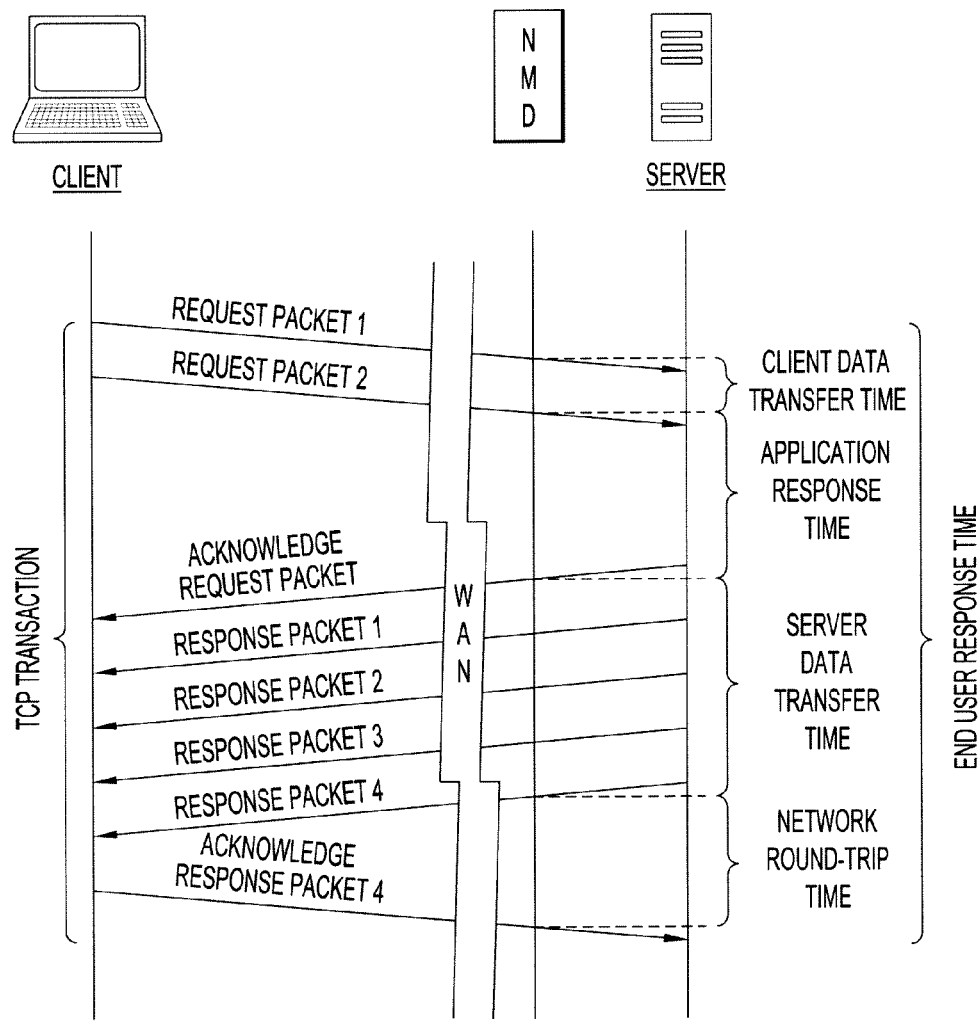
FIG. 2 is a representation of the packet exchange timing involved in a TCP transaction between a client and a server on a network.

As used herein, a "transaction" is an individual client request followed by the server's response to that request. In an individual flow, there can be any number N of transactions, from one to hundreds or more. FIG. 2 diagrammatically illustrates the timing and sequence of an individual TCP transaction that would occur within a TCP flow between a client and server. In the diagram of FIG. 2, time increases downward in the vertical direction, and the slope of the lines shown traveling between the client and server over the WAN suggests the passage of time across the network. Note that the timings and relative positioning of equipment shown in FIG. 2 is not to scale. For example, for purposes of illustration, FIG. 2 shows an exaggerated time difference between the timing of packets at the network management device and at the server. In reality, this time difference is very small or negligible relative to the time required for packets to traverse the WAN, since the network management device is co-located with the server at the same site in this example.

The TCP transaction begins with the client sending one or more request packets to the server over the WAN. In this example, a network management device is located at the server site and monitors packets that are being transmitted and received by the server. The server responds to the client request with an acknowledgement, and then sends a response by transmitting one or more response packets to the client over the WAN. Finally, the client acknowledges that it has received the response by sending an acknowledgement back to the server, which concludes a single transaction. The acknowledgement scheme can be configured in a number of ways. One common approach is for the client to acknowledge every other response packet by sending an acknowledgement packet back to the server. Multiple such transactions can occur successively in a flow.

Figure 3:
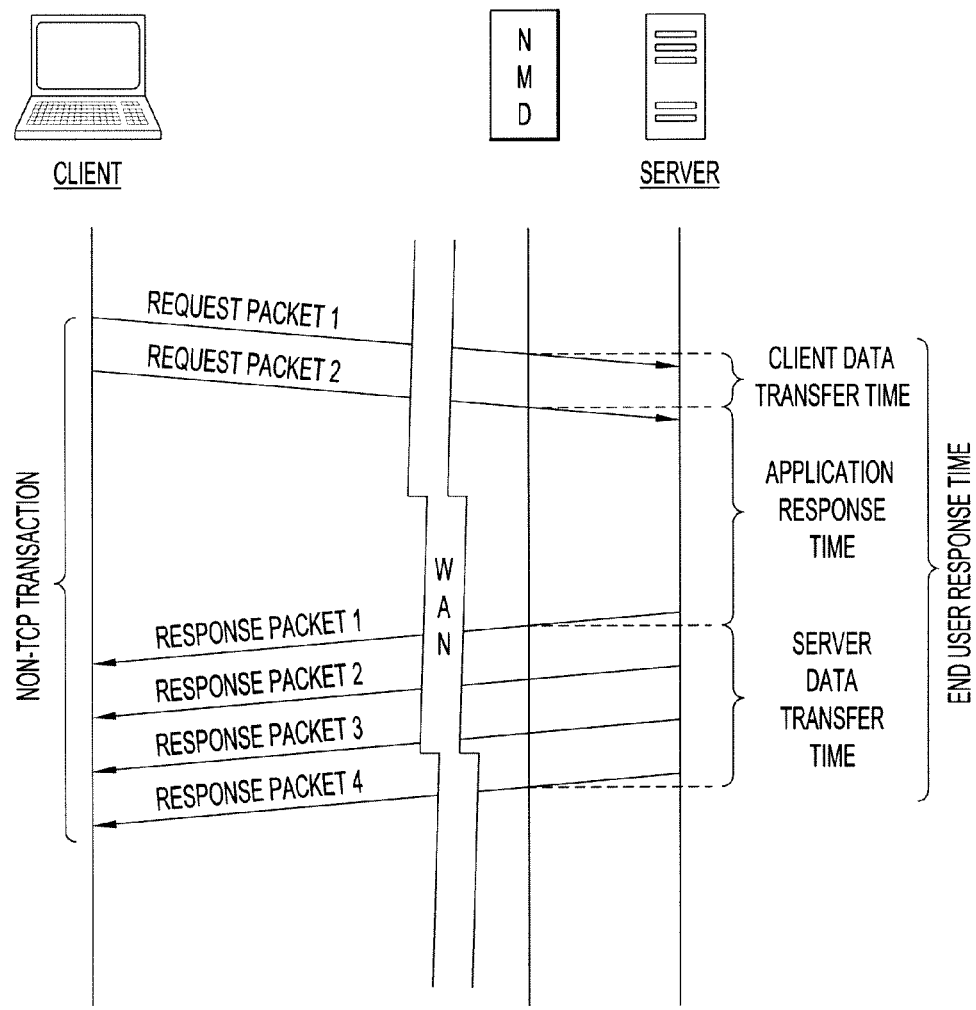
FIG. 3 is a representation of the packet exchange timing involved in a non-TCP transaction between a client and a server on a network.

FIG. 3 illustrates a single non-TCP transaction which would occur in a non-TCP flow (like FIG. 2, the timing in FIG. 3 is not to scale). The notable difference between the non-TCP transaction in FIG. 3 and the TCP transaction in FIG. 2 is that the non-TCP transaction does not include an acknowledgement message being sent by the server to acknowledge the client's initial request or an acknowledgement message being sent by the client to acknowledge the server's response message. In this case, the server responds to the request directly by sending the requested data, and the transaction concludes upon the last of the response packets being received by the client. Another transaction can then be initiated by the client by sending another request message.

As previously noted, any of a wide variety of performance metrics can be measured from information gleaned by monitoring packets at one or more NMDs. At a transaction level, one of the performance metrics of interest may be end-user response time (EURT) or one of the segments of time that constitute EURT. FIG. 2 illustrates how EURT and its constituent segments can be determined in the context of a TCP transaction from observations made by a network management device located at the server site. EURT can be determined as the sum of four measurable time periods: client data transfer time (client DTT); application (server) response time; server data transfer time (server DTT); and network round-trip time.

The client DTT can be measured by the NMD at the server as the time period required to receive the entire request from the client. In the case where the request consists of a single packet, the client DTT is essentially zero, since the duration of the packet itself is very small relative to the millisecond time scale suitable for measuring network response times. In the example shown in FIG. 2, the request consists of two packets, and the duration of the client DTT is the time period from receipt of the first request packet to receipt of the second request packet. The application (or server) response time is the delay between receipt of the final packet of the request message and transmission of the first packet of the response message by the server. The server DTT is the time period required for the server to transmit the entire response message to the client's request. The response message may be as short as one or two packets or may be many packets requiring hundreds, thousands, or more of milliseconds to transmit. The impact of WAN optimization may be most pronounced on longer response messages, where a greater opportunity for economizing exists.

The final component of EURT in a TCP transaction is the network round-trip time, which accounts for the acknowledgement mechanism built into the TCP transaction scheme. Conceptually, the network round-trip time is shown in FIG. 2 as the round-trip delay between the transmission time of the final response packet (measured by the NMD located with the server) and the reception time at the NMD of the corresponding acknowledge packet sent by the client to acknowledge receipt of the final response packet. In practice, it may be possible to compute or estimate network round-trip time prior to this final packet exchange. For example, network round-trip time can be determined from some combination of the initial SYN, SYN ACK, and ACK messages used to initiate the TCP flow. Another option is to determine the network round-trip time from a response packet and its corresponding acknowledge packet that are sent earlier in the response message. For example, if the client acknowledges every other response packet received from the server, any of the intermediate packets within the response message can be used to determined the network round-trip time (i.e., the final response packet and its corresponding acknowledge packet may be just one of several possible pairs of packets that can be used for determining network round-trip time, depending on the length of the response message).

By summing the client DTT, the application response time, the server DTT, and the network round-trip time, the end-user response time (EURT) can be computed. In the example shown in FIG. 2, the EURT is measured based on the timing of packets seen by the network management device located at the same site as the server. However, this measurement can generally be assumed to be a very close approximation of the EURT experienced at the client site as well. Moreover, the EURT can be measured by a network management device located at other points in the network, such as at the client's site.

Unlike the TCP transaction shown in FIG. 2, the non-TCP transaction shown in FIG. 3 does not involve acknowledgements by the client and server within the transaction. Consequently, the EURT is computed as the sum of only the client DTT, the application response time, and the server DTT, and does not include the network round-trip time. EURT is only one of several performance metrics that the network management system may monitor and display. Any of a wide variety of performance metrics may be monitored, including but not limited to various measures of latency, response time, jitter, data delivery efficiency or data delivery ratio, and throughput. For example, in the TCP environment, a number of TCP-related performance metrics can be measured such as flow resets, transaction resets, zero window states (timings), the number of packet or message retransmissions that occur, the number of occurrences of packets being out of order, and data rates in terms of bytes and packets.

The system and devices described herein provide the ability to correctly measure and display the WAN optimization attributes that are affecting a flow and/or transaction as it traverses the network. The capability to calculate and display the WAN optimization policy and type of optimization that is being used on a specific flow and transaction provides the unique ability to monitor and troubleshoot application performance issues as they relate to data in a WAN optimized WAN/LAN environment. In particular, a transaction viewer presented on a display device provides the ability to visualize the WAN optimization policy that is affecting the traffic, thereby providing the user with enhanced troubleshooting capability and operational verification in this environment.

The invention provides the ability to visualize and quantify the impact of WAN optimization attributes on one or more performance metrics from a high level in the network all the way down to an individual transaction layer. For example, WAN optimization can be viewed together with one or more performance metrics for an entire enterprise, on a site-by-site basis or for selected sites, on an application-by-application basis or for selected applications, for particular clients or servers, for individual flows, and for individual transactions within a flow.

The techniques of the invention provide useful insight into the way WAN optimization works in specific contexts. For example, it is possible to have a site from which all traffic is optimized (e.g., because a WAN optimization unit has been deployed there). However, other sites may lack a WAN optimization unit and so have no optimization. Consequently, from a site-to-site perspective, it is desirable to be able to delineate between the performance of sites that have been optimized compared to other, non-optimized sites.

Another point of interest with WAN optimization is the effectiveness of the optimization on a particular application to which it is being applied. In this context, it may be helpful to view performance both before and after optimization is applied (e.g., a before and after visualization). To accomplish this effect, performance metrics of interest can be measured or tracked prior to applying WAN optimization and then measured again after applying WAN optimization to the sessions of interest, providing a comparative analysis of the benefit of the WAN optimization and how the application is performing in the environment.

As previously explained, WAN optimization typically involves a number of types of optimization used in combination. For example, Cisco Systems' WAAS optimization system includes TCP flow optimization (TFO), compression (LZ), data redundancy elimination (DRE), and application-specific optimizers (e.g., HTTP optimization). The invention enables the user to delineate performance based on optimization type, so that in a WAN optimization environment based on the optimization policy, performance can be displayed as a function of the particular optimization or combination of optimizations that were employed, and performance associated with different types of optimization can be compared. For example, the performance of one or more transactions, flows, clients, servers, sites, or applications, optimized with only TFO can be compared to the performance of one or more transactions, flows, clients, servers, sites, or applications optimized with all of TFO, LZ, DRE, and HTTP. Thus, the effect of WAN optimization can be differentiated or delineated as a function of the type of optimization employed.

Further, the ability to associate measurements of performance metrics with WAN optimization as a function of the type of optimization applied exists down to the transaction detail level. That is, at an individual transaction layer, the invention provides the ability to delineate whether an individual transaction was affected by WAN optimization and to indicate the specific type of optimization employed. Thus, the type of optimization applied is displayed in association with the performance resulting from that type of optimization in the context of an individual transaction between a client and a server.

Figure 4:
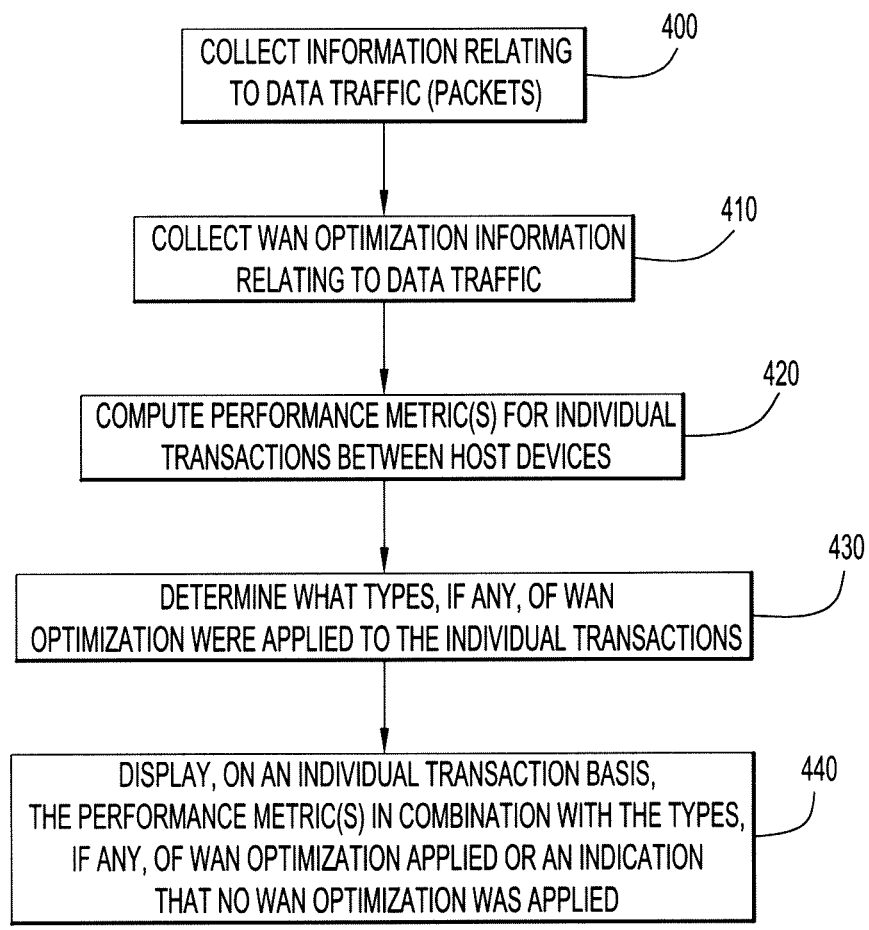
FIG. 4 is a functional flow diagram of operations performed by a network management system to associate and display WAN optimization information with a corresponding performance metric.

FIG. 4 is a top-level flow diagram of the methodology employed to carry out an embodiment of the invention involving displaying performance data and WAN optimization information on a transaction-by-transaction basis. In operation 400 shown in FIG. 4, one or more NMDs essentially monitor data traffic at points between host devices (e.g., clients and servers) and collect information about the data traffic (e.g., the timing of certain packets, etc.). The network management device(s) also collects WAN optimization information relating to the data traffic, as suggested by the links between NMD 22 and WAN optimizer 18 and between NMD 24 and WAN optimizer 20 in FIG. 1 (operation 410). One or more processors located in the network management device and/or in a back end system, generically represented by processor 32 in FIG. 1, compute at least one performance metric (e.g., EURT and its components) for individual transactions (i.e., on a transaction level and on a transaction-by-transaction basis) between the host devices (operation 420) and determine what types, if any, of WAN optimization were applied to the individual transactions (operation 430). In operation 440, a display device is controlled to display on an individual transaction basis the performance metric(s) in combination with either the types of WAN optimization applied to the individual transaction or an indication that no WAN optimization was applied to the individual transaction.

The processor has the further capability to aggregate the performance data to higher levels, and the performance metric(s) can be displayed in combination with the associated WAN optimization at those higher levels. For example, the processor can compute the performance metric(s) at an individual flow level (e.g., on a flow-by-flow basis) from the performance metric information associated with the individual transactions in each flow. By selecting the appropriate options via the user interface, the display device can be configured to display on an individual flow basis the performance metric(s) in combination with either the types of WAN optimization applied to the individual flow or an indication that no WAN optimization was applied to the individual flow. Likewise, the performance metric(s) can be computed at the application level (e.g., on an application-by-application basis) based on the performance metric(s) of the transactions or flows that constitute the applications, and by selecting the appropriate display options, the performance metric(s) can be displayed on an application basis in combination with the types of WAN optimization, if any, applied to the individual applications. The same principle applies at the host (e.g., server) or site level, where the performance metric(s) is displayed on an individual host or site basis in combination with the associated types of WAN optimization applied to the host or site. In this manner, the association between WAN optimization and the resulting performance can be successively "rolled up" from the transaction level to the enterprise level, both in terms of computing the performance metrics and associating and displaying the performance metrics with the WAN optimization applied to that portion of the enterprise or network.

It will be appreciated that the above described operations and methodologies can be carried out by executing instructions stored on a computer readable medium (i.e., software) on a processor or processors located within the network management system (e.g., within an NMD and/or one or more separate computing devices or processors).

Figure 5:
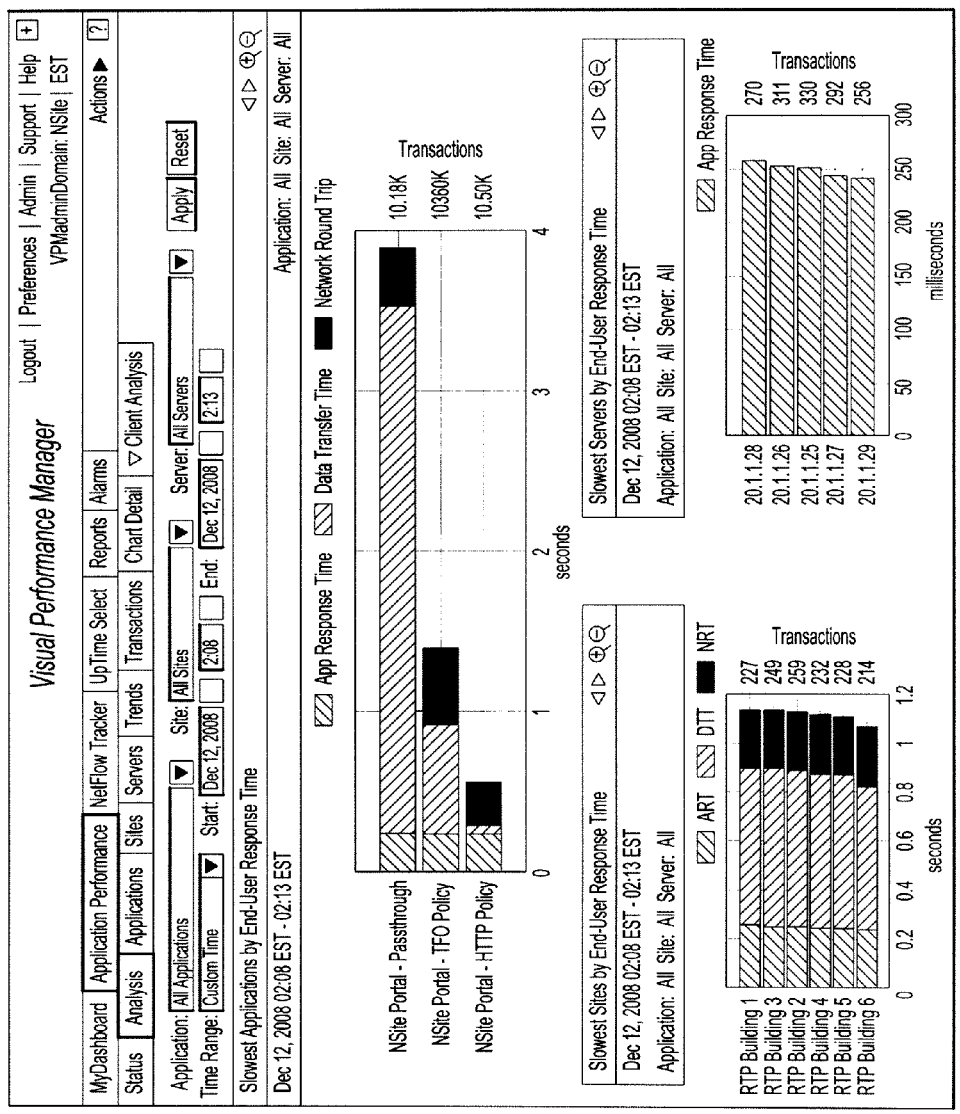
FIG. 5 is an exemplary screen shot displaying a high-level view of three different applications across an enterprise according to an embodiment of the invention.

FIGS. 5-7 are exemplary screen shots which illustrate how optimization information (e.g., whether WAN optimization was applied and the type(s) of WAN optimization) can be displayed relative to or in connection with performance information at a variety of levels within an enterprise. These examples refer to certain WAN optimization techniques available in Cisco Systems' WAAS product (i.e., TCP flow optimization (TFO), compression (LZ), Data Redundancy Elimination (DRE), and an application-specific optimization (HTTP)). However, it will be appreciated that the invention is not limited to any particular WAN optimization products, or any particular WAN optimization techniques or combinations thereof.

The screen shot shown in FIG. 5 is a high-level view across an enterprise, looking at three different applications in a simple test environment. As suggested by the darker box on the top row of the Visual Performance Manager, "Application Performance" has been selected for viewing. Within Application Performance, "Analysis" has been selected, as indicated by the darker box in the second row from the top. The visual performance manager provides fields (e.g., fillable and/or with drop down lists) to permit the user to select certain applications, sites, servers, and time ranges.

The viewing window includes three separate bar graphs respectively depicting the slowest applications by end-user response time (EURT), the slowest sites by EURT, and the slowest servers by EURT. Of interest here is the application bar graph, which allows the user to see the comparative impact or benefit of different levels of WAN optimization. On the topmost application labeled "Passthrough," no WAN optimization was performed. The next application labeled "TFO Policy" had only TFO optimization applied to it. The bottom-most application labeled "HTTP Policy" had all of TFO, DRE, LZ, and HTTP application optimization applied to it.

To the right of each application label, the EURT is shown as a horizontal bar, with the application response time, data transfer time, and network round trip time components of the EURT being depicted within the bar with different colors, markings, or other indicia. In this instance, the EURT for the non-optimized application is nearly four seconds. The application optimized with just TFO has a significantly faster EURT (less than 1.5 seconds), with virtually all of the improvement resulting from a shorter data transfer time. The application optimized with TFO, DRE, LZ, and HTTP has a significantly faster EURT that the application optimized with only TFO (about 0.5 seconds), with a very short data transfer time and a somewhat shorter network round-trip time. In addition to providing a pictorial, graphical view that the different types of optimization have the greatest impact on data transfer time performance, the bar graph also shows that the application response time was largely unaffected by the WAN optimization, which is not unexpected. In the example shown in FIG. 5, the performance metric being shown is EURT and its constituents. It will be understood that the effects of WAN optimization can also be shown on other performance metrics in a graphical manner, such as those performance metrics previously mentioned.

FIG. 6 is a screen shot of a transaction log view, which is essentially a sequential listing of transactions. The transactions included in the log can be limited by any of a number of criteria based on user-selectable filters. For example, in an unfiltered case, every transaction in an enterprise can be listed. However, the list can be limited to certain applications, certain servers or clients, certain time windows, certain ports, certain sites, certain performance levels, and combinations thereof. For example, the list of transactions in the log can be limited to only the transactions of certain sites, applications, or servers whose performance is below a certain level for a certain performance metric. Another option can be to limit the transactions listed to those of just un-optimized traffic, just optimized traffic, or just traffic optimized with certain types of WAN optimization. Generally, the user has the option to "drill down" to the transaction level from a higher level. For example, if the user sees that the performance of the enterprise is below normal, the user can use the visual performance manager to look at the performance of certain sites, servers, and/or applications, and can then go further down to the level of individual flows and ultimately down to the level of individual transactions within a flow in order to find root causes of performance problems.

Referring again to FIG. 6, each transaction listed in the log includes certain information about the transaction, and the user may select which information fields are displayed for the transactions. In this example, each transaction entry includes a transaction number (e.g., 31, 32, 33), a date and time, an application identifier, a client IP address, a server IP address, the EURT and its four components (application response time (ART), client DTT, server DTT, and network round-trip time), the WAN optimization policy, and the request made in the transaction. The WAN optimization policy field allows the user to see whether or not any WAN optimization was applied to the transaction ("--" indicates that no optimization was applied), and how the transaction was optimized (i.e., what type of WAN optimization was applied). For example, only TFO optimization was applied to transaction 32, whereas all of TFO, DRE, LZ, and HTTP were applied to transaction 34. In this manner, the particular type or combination of WAN optimization policy employed is juxtaposed with the performance metric(s) of interest for each transaction in the list. In the example listing shown in FIG. 6, for instance, the un-optimized transactions have a relatively long EURT, whereas the optimized transactions have generally much shorter EURTs.

FIG. 7 illustrates one possible technique for customizing a transaction log view using the visual performance manager. As indicated by the dark box on the topmost row within the visual performance manager, "Application Performance" is selected. At the next level, "Transactions" are selected, as indicated by the dark box in the second row. The user is presented with a number of filtering options. The filter is shown in a collapsed mode near the top of the display window (indicated by the rightward pointing arrow to the left of the word "Filter"), in which the selected display options are merely listed. In an expanded mode shown in the middle of the display window (indicated by the downward pointing arrow to the left of the word "Filter"), the user is presented with a variety of filter fields, which may be fillable or selectable from drop-down lists. For example, the user can select a time range, application(s), site(s), server(s), client IP(s), certain request types, certain response types, transaction type(s), certain metrics, and the type of WAN optimization (all, optimized, un-optimized, by optimization type, etc.). Note that both the collapsed and expanded mode of the filter are shown in FIG. 7 for convenience, but that only one of these two views are typically shown at a time by clicking on the directional arrow. The resulting transaction log, another example of which is shown at the bottom of the window in FIG. 7, is then displayed based on the user-selected filtering. Here again, the performance metric being shown along with the WAN optimization policy for each transaction is the end-user response time (EURT). It will be appreciated that EURT is just one of several different performance metrics that can be shown with the corresponding WAN optimization policy on a transaction-by-transaction or flow-by-flow basis. Moreover, the screen shots shown in FIGS. 4-6 are just a few examples of a greater variety of visualization that are possible with the system of the invention, wherein WAN optimization policy may be shown in connection with performance metrics from an enterprise level all the way down to the individual transaction level.

Having described embodiments of methods and apparatus for determining and displaying WAN optimization attributes for individual transactions, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for associating WAN optimization attributes with performance metrics of transactions between host devices on a network, comprising:

a network management device arranged at a point between host devices communicating over the network, configured to monitor data traffic at the point between the host devices, the data traffic comprising individual flows between the host devices, wherein the individual flows include individual transactions, wherein each transaction comprises a bidirectional exchange of packets between first and second hosts including an individual request from the first host followed by a response to the request by the second host, the network management device being further configured to collect WAN optimization information relating to the data traffic;
a processor configured to compute at least one performance metric for individual transactions between the host devices based on information collected by the network management device at the point, and to determine what types, if any, of WAN optimization were applied to the individual transactions; and
a display device configured to display on an individual transaction basis the at least one performance metric in combination with either the types of WAN optimization applied to the individual transaction or an indication that no WAN optimization was applied to the individual transaction.

2. The apparatus of claim 1, wherein at least some of the individual flows comprise transmission control protocol (TCP) flows, and the individual transactions comprise TCP transactions.

3. The apparatus of claim 1, wherein the processor is further configured to compute the at least one performance metric at an individual flow level, and wherein the display device is further configured to display on an individual flow basis the at least one performance metric in combination with either the types of WAN optimization applied to the individual flow or an indication that no WAN optimization was applied to the individual flow.

4. The apparatus of claim 1, wherein the processor is further configured to compute the at least one performance metric at an application level, and wherein the display device is further configured to display on an individual application basis the at least one performance metric in combination with either the types of WAN optimization applied to the application or an indication that no WAN optimization was applied to the application.

5. The apparatus of claim 1, wherein the processor is further configured to compute the at least one performance metric at a host or site level, and wherein the display device is further configured to display on an individual host or site basis the at least one performance metric in combination with either the types of WAN optimization applied to the host or site or an indication that no WAN optimization was applied to the host or site.

6. The apparatus of claim 1, wherein the at least one performance metric includes end-user response time.

7. The apparatus of claim 1, wherein the display device is further configured to display the individual transactions in a log listing, wherein each log entry includes a field identifying the transaction, a field indicating a value of the at least one performance metric, and a field indicating the types, if any, of WAN optimization applied to the transaction.

8. The apparatus of claim 1, wherein the types of WAN optimization include at least one of: transmission control protocol (TCP) flow optimization, compression, caching, and application-specific optimization.

9. A method of displaying WAN optimization attributes in association with performance metrics of transactions between host devices on a network, comprising:
collecting information, at a point between the host devices, relating to data traffic comprising individual flows between the host devices, wherein the individual flows include individual transactions, wherein each transaction comprises a bidirectional exchange of packets between first and second hosts including an individual request from the first host followed by a response to the request by the second host;
collecting WAN optimization information relating to the data traffic;
computing at least one performance metric for individual transactions between the hosts;
determining what types, if any, of WAN optimization were applied to the individual transactions; and
controlling a display device to display on an individual transaction basis the at least one performance metric in combination with either the types of WAN optimization applied to the individual transaction or an indication that no WAN optimization was applied to the individual transaction.

10. The method of claim 9, wherein at least some of the individual flows comprise transmission control protocol (TCP) flows, and the individual transactions comprise TCP transactions.

11. The method of claim 9, further comprising:
computing the at least one performance metric at an individual flow level; and
controlling the display device to display on an individual flow basis the at least one performance metric in combination with either the types of WAN optimization applied to the individual flow or an indication that no WAN optimization was applied to the individual flow.

12. The method of claim 9, further comprising:
computing the at least one performance metric at an application level; and
controlling the display device to display on an individual application basis the at least one performance metric in combination with either the types of WAN optimization applied to the application or an indication that no WAN optimization was applied to the application.

13. The method of claim 9, further comprising:
computing the at least one performance metric at a host or site level; and
controlling the display device to display on an individual host or site basis the at least one performance metric in combination with either the types of WAN optimization applied to the host or site or an indication that no WAN optimization was applied to the host or site.

14. The method of claim 9, wherein the at least one performance metric includes end-user response time.

15. The method of claim 9, further comprising:
controlling the display device to display the individual transactions in a log listing, wherein each log entry includes a field identifying the transaction, a field indicating a value of the at least one performance metric, and a field indicating the types, if any, of WAN optimization applied to the transaction.

16. The method of claim 9, wherein the types of WAN optimization include at least one of: transmission control protocol (TCP) flow optimization, compression, caching, and application-specific optimization.

17. A non-transitory computer readable medium storing instructions, that when executed by a computer, cause the computer to perform functions of:
collecting information, at a point between host devices communicating across a network, relating to data traffic comprising individual flows between the host devices, wherein the individual flows include individual transactions, wherein each transaction comprises a bidirectional exchange of packets between first and second hosts including an individual request from the first host followed by a response to the request by the second host;
collecting WAN optimization information relating to the data traffic;
computing at least one performance metric for individual transactions between the hosts;

determining what types, if any, of WAN optimization were applied to the individual transactions; and controlling a display device to display on an individual transaction basis the at least one performance metric in combination with either the types of WAN optimization applied to the individual transaction or an indication that no WAN optimization was applied to the individual transaction.

18. The computer readable medium of claim 17, storing further instructions, that when executed by a computer, cause the computer to perform the further functions of:

computing the at least one performance metric at an individual flow level; and controlling the display device to display on an individual flow basis the at least one performance metric in combination with either the types of WAN optimization applied to the individual flow or an indication that no WAN optimization was applied to the individual flow.

19. The computer readable medium of claim 17, storing further instructions, that when executed by a computer, cause the computer to perform the further functions of:

computing the at least one performance metric at an application level; and controlling the display device to display on an individual application basis the at least one performance metric in combination with either the types of WAN optimization applied to the application or an indication that no WAN optimization was applied to the application.

20. The computer readable medium of claim 17, storing further instructions, that when executed by a computer, cause the computer to perform the further functions of:

computing the at least one performance metric at a host or site level; and controlling the display device to display on an individual host or site basis the at least one performance metric in combination with either the types of WAN optimization applied to the host or site or an indication that no WAN optimization was applied to the host or site.

* * * * *